Figure 1:
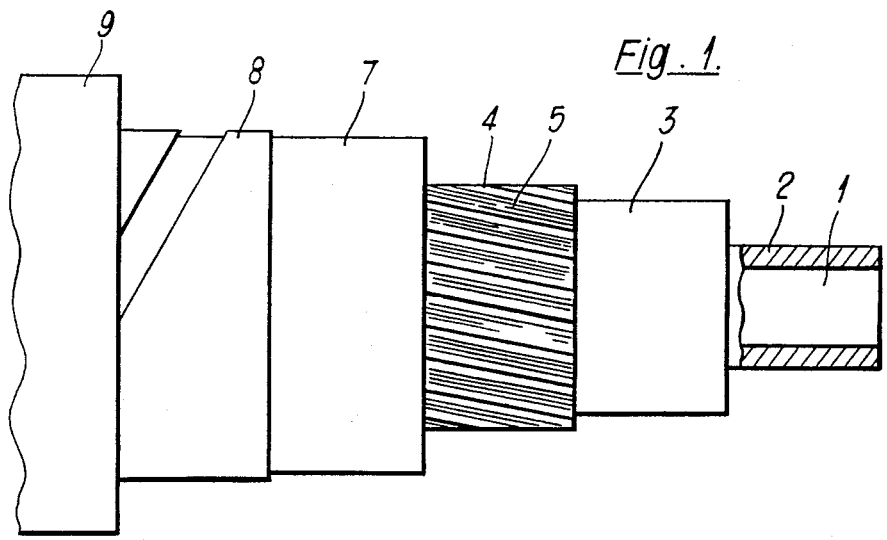

United States

Slaughter

[11] 3,883,218
[45] May 13, 1975

[54] OPTICAL GUIDES
[75] Inventor: Raymond Jeffrey Slaughter, Chislehurst, England
[73] Assignee: British Insulated Callender's Cables Limited, London, England
[22] Filed: Nov. 8, 1973
[21] Appl. No.: 413,823

[30] Foreign Application Priority Data
Nov. 10, 1972 United Kingdom............... 52099/72

[52] U.S. Cl................................................. 350/96 B
[51] Int. Cl. ................................................ G02b 5/16
[58] Field of Search........................ 350/96 B; 65/4

[56] References Cited
UNITED STATES PATENTS
| | | | |
|---|---|---|---|
| 3,498,864 | 3/1970 | Ogle | 350/96 B |
| 3,505,046 | 4/1970 | Phaneuf | 350/96 B |
| 3,554,721 | 1/1971 | Gardner | 350/96 B |
| T900,002 | 7/1972 | Wielar | 350/96 B |

Primary Examiner—James W. Lawrence
Assistant Examiner—C. E. Church
Attorney, Agent, or Firm—Buell, Blenko & Ziesenheim

[57] ABSTRACT

An optical cable comprises a central elongate non-optical reinforcing member; a plurality of optical fibres and/or groups of optical fibres for use together as a single light guide, which optical fibres and/or groups of optical fibres are secured side by side on or within a substantially flat flexible support member which is lapped helically about the reinforcing member in at least one layer; and an outer protective sheath. The position of each optical fibre or group of optical fibres with respect to the other optical fibres or groups of optical fibres of the or each layer is constant throughout the length of the cable. The reinforcing member is of such a material and of such a cross-sectional area having regard to the material or materials and cross-sectional area of each optical fibre that the reinforcing member at least substantially reduces the strain that would otherwise be imparted to the optical fibres when the cable is stressed in such a way as to tend to subject any optical fibre to a tensile force.

22 Claims, 4 Drawing Figures

PATENTED MAY 13 1975  3,883,218

OPTICAL GUIDES

This invention relates to optical guides for the transmission of the ultra-violet, visible and infra-red regions of the electromagnetic spectrum, which regions, for convenience, will hereinafter all be included in the generic term "light," and especially, but not exclusively, to optical waveguides for use in the telecommunications field adapted for transmission of light having a wavelength within the range 0.8 to 1.1 micrometres.

For the purpose of transmitting light in an optical transmission system it has been proposed to employ optical guides including one or more than one optical fibre. Where an optical guide comprises a plurality of optical fibres these are generally arranged in a bundle which is sometimes enclosed in an outer protective sheath.

The invention is especially, but not exclusively, concerned with optical guides includingg one or more than one optical fibre of composite form comprising a core of transparent material clad throughout its length with another transparent material of lower refractive index which by total internal reflection of light being transmitted along the fibre confines at least a major proportion of the light within the fibre. A composite optical fibre is generally, but not necessarily, made of two glasses of different refractive indices, the glass forming the core having a higher refractive index than the glass forming the cladding. In an alternative form of composite optical fibre the core may be made of a transparent liquid having a higher refractive index than that of the cladding.

It is an object of the present invention to provide an improved optical cable which by virtue of its construction both provides for ready identification of each optical fibre, or of each group of optical fibres used together as a single light guide with a single light source, of the cable at any transverse cross-section along the length of the cable, and at least substantially reduces the strain that would otherwise be imparted to each or any optical fibre of the cable when the cable is stressed in such a way as to tend to subject each or any optical fibre to a tensile force.

According to the invention the optical cable comprises a central elongate non-optical reinforcing member; a plurality of optical fibres and/or groups of optical fibres for use together as a single light guide, which optical fibres and/or groups of optical fibres are secured side by side on or within a substantially flat flexible support member which is lapped helically about the reinforcing member in at least one layer; and an outer protective sheath; the position of each optical fibre or group of optical fibres with respect to the other optical fibres or groups of optical fibres of the or each layer being constant throughout the length of the cable, and the reinforcing member being of such a material and of such a cross-sectional area having regard to the material or materials and cross-sectional area of each optical fibre that the reinforcing member at least substantially reduces the strain that would otherwise be imparted to the optical fibres when the cable is stressed in such a way as to tend to subject any optical fibre to a tensile force.

Preferably the substantially flat flexible support member is in the form of at least one tape, for instance of paper or plastics material or of metal or metal alloy.

Where the flexible support member of the layer or of at least one of the layers consists of a single tape the optical fibres and/or groups of optical fibres are secured by adhesive to one surface of the tape; where the flexible support member of the layer or of at least one of the layers consists of two tapes, one overlying the other, the optical fibres and/or groups of optical fibres are sandwiched between the two tapes and are secured by adhesive to the adjacent surfaces of the tapes. An alternative flexible support member comprises a single tape of plastics material with the optical fibres and/or groups of optical fibres embedded in it.

Where at least two layers of tape carrying the optical fibres and/or groups of optical fibres are lapped helically about the reinforcing member the tapes are so applied that the fibres and/or groups of fibres of each layer may be of opposite hand to that of the fibres and/or groups of fibres of the or each adjacent layer. Since the position of each optical fibre or group of optical fibres in the or each layer with respect to the other fibres or groups of the layer is constant throughout the length of the cable any optical fibre or group of optical fibres can be readily identified at any transverse cross-section of the cable.

Preferably the central non-optical reinforcing member is of a material which has a Young's Modulus of at least that of glass, i.e., of at least $6.9 \times 10^4$ MN/m$^2$. The central reinforcing member may be a single solid elongate element or where flexibility is of importance it may comprise a plurality of elongate elements stranded together. Preferably the reinforcing member includes at least one electrical conductor. Where the reinforcing member is a single elongate element the element itself may be of an electrically conductive metal or metal alloy of the necessary tensile strength, for instance cadmium copper, but preferably the electrical conductor is constituted by a layer of electrically conductive metal or metal alloy applied to a wire of steel or other material of appropriate tensile strength. Where the reinforcing member is of stranded form at least one of the elongate elements of the stranded member may be of electrically conductive metal or metal alloy.

Preferably with a view to increasing the overall diameter of the reinforcing member and to facilitating lapping of the tape or tapes carrying the optical fibres and/or group of optical fibres, a layer of rubber or plastics material is extruded or otherwise applied about the reinforcing member. To provide a suitably resilient bedding for the tape or tapes carrying the optical fibres and/or groups of optical fibres without unduly increasing the weight of the cable this cable is preferably of cellular plastics material. A layer of rubber or plastics material, for instance cellular plastics material, is preferably also applied directly over the layer or outermost layer of optical fibres and/or groups of optical fibres.

The optical cable may be provided with an outer concentric conductor positioned beneath the outer protective sheath. This outer conductor may take any convenient form but with a view to enhancing the flexibility of the cable it preferably comprises at least one tape of electrically conductive metal or metal alloy lapped helically about the cable.

The outer protective sheath is preferably an extruded sheath of plastics material. Preferably it is made of a hard polyolefin such as polypropylene or a modified polypropylene, for example propylene ethylene copolymer. Other suitable materials for the sheath include polyethylene, especially high density polyethylene, and polyvinyl chloride. The sheath may have an oversheath of a material having a low friction co-efficient, such as nylon.

The invention will be further illustrated by a description, by way of example, of a preferred form of optical cable with reference to the accompanying drawing in which:

FIG. 1 is a cut-back side view of the cable drawn on an enlarged scale, and

Figure 2:
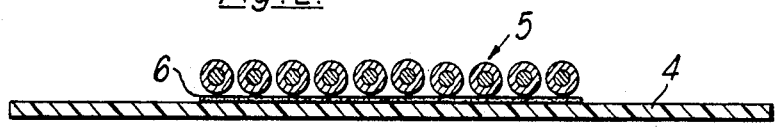
Figure 3:
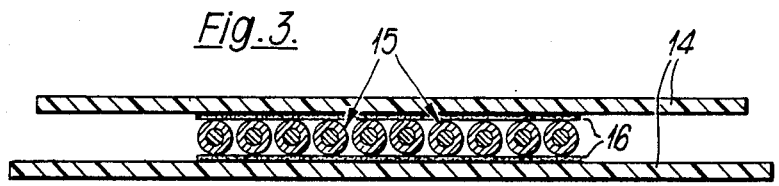
Figure 4:
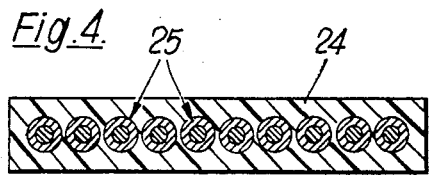

FIGS. 2, 3 and 4, respectively are cross-sectional end views drawn on an enlarged scale of flexible support members carrying optical fibres for use in optical cables of the invention.

Referring to FIGS. 1 and 2 the optical cable comprises a steel wire 1 having an overall cladding 2 of copper of radial thickness 0.25 mm, the copper clad steel wire having a diameter of 1.5 mm; a layer 3 of cellular polyethylene of radial thickness 0.6 mm; a paper tape 4 (FIG. 2), of width 2 mm and thickness 0.1 mm, which has ten composite optical fibres 5, having an overall diameter of 100 $\mu$m, each of which comprises a core of diameter 80 $\mu$m and a cladding of lower refractive index than the core, extending side by side lengthwise along the tape to which they are secured by a suitable adhesive 6, the paper tape carrying the optical fibres being helically lapped about the layer 3; a layer 7 of cellular polyethylene of radial thickness 0.6 mm; a copper tape 8, of width 4 mm and of thickness 0.25 mm, wound in an open helix about the layer 7; and an outer protective sheath 9 of polyethylene having a radial thickness of 0.6 mm. The optical cable has an overall diameter of 5.9 mm.

The flexible support member shown in FIG. 3 consists of two paper tapes 14, each of width 2 mm and thickness 0.1 mm, which have between their adjacent faces ten composite optical fibres 15 extending side by side lengthwise along the tapes, the fibres being secured to the adjacent faces of the tapes by adhesive 16. Each composite optical fibre has an overall diameter of 100 $\mu$m and consists of a core of diameter 80 $\mu$m and a cladding of lower refractive index than the core.

The flexible support member shown in FIG. 4 comprises a tape 24 of plastics material, of width 2 mm and thickness 0.3 mm in which are embedded ten optical fibres extending side by side lengthwise within the tape. Each composite optical fibre has an overall diameter of 100 $\mu$m and consists of a core of diameter 80 $\mu$m and cladding of a glass of lower refractive index than the core.

In the flexible support members carrying optical fibres as shown in FIGS. 2 to 4, the fibres are arranged with their axes lying in a substantially common plane and spaced equal distances apart. In an alternative embodiment (not shown) the fibres of each flexible support member could be arranged in two or more groups, each group consisting of two or more fibres arranged close together with their axes lying in a substantially common plane and intended for use with a single light source. The spacing between adjacent groups would be substantially greater than the spacing between the fibres of any group.

What I claim as my invention is:

1. An optical cable comprising a central elongate non-optical reinforcing member; a plurality of elongate optical elements, each element consisting of at least one optical fibre which elongate optical elements are embedded side by side in a substantially flat tape of plastics material which is lapped helically about the reinforcing member in at least one layer; and an outer protective sheath; the position of each elongate optical element with respect to the other elongate optical elements of the or each layer being constant throughout the length of the cable, and the reinforcing member being of such a material and of such a cross-sectional area having regard to the material or materials and cross-sectional area of each optical fibre that the reinforcing member at least substantially reduces the strain that would otherwise be imparted to the optical fibres when the cable is stressed in such a way as to tend to subject any optical fibre to a tensile force.

2. An optical cable comprising a central elongate non-optical reinforcing member; a plurality of elongate optical elements, each element consisting of at least one optical fibre which elongate optical elements are secured by adhesive side by side on a surface of at least one substantially flat tape which is lapped helically about the reinforcing member in at least one layer; and an outer protective sheath; the position of each elongate optical element with respect to the other elongate optical elements of the or each layer being constant throughout the length of the cable, and the reinforcing member being of such a material and of such a cross-sectional area having regard to the material or materials and cross-sectional area of each optical fibre that the reinforcing member at least substantially reduces the strain that would otherwise be imparted to the optical fibres when the cable is stressed in such a way as to tend to subject any optical fibre to a tensile force.

3. An optical cable as claimed in claim 2, wherein the elongate optical elements of the layer or of at least one of the layers are sandwiched between, and secured by adhesive to adjacent surfaces of, two substantially flat tapes.

4. An optical cable comprising a central elongate non-optical reinforcing member; a plurality of elongate optical elements, each element consisting of at least one optical fibre, which elongate optical elements are secured side by side on or within a substantially flat flexible support member which is lapped helically about the reinforcing member in at least one layer; and an outer protective sheath; the position of each elongate optical element with respect to the other elongate optical elements of the or each layer being constant throughout the length of the cable, and the reinforcing member being of such a material and of such a cross-sectional area having regard to the material or materials and cross-sectional area of each optical fibre that the reinforcing member at least substantially reduces the strain that would otherwise be imparted to the optical fibres when the cable is stressed in such a way as to tend to subject any optical fibre to a tensile force.

5. An optical cable as claimed in claim 4,, in which at least two layers of flexible support members carrying elongate optical elements are lapped helically about the reinforcing member, wherein the optical elements of each layer are of opposite hand to that of the optical elements of the or each adjacent layer.

6. An optical cable as claimed in claim 4, wherein the central reinforcing member is of a material which has a Young's Modulus of at least $6.9 \times 10^4$ MN/m$^2$.

7. An optical cable as claimed in claim 4, wherein the central reinforcing member comprises a plurality of elongate elements stranded together.

8. An optical cable as claimed in claim 7, wherein at least some of the plurality of elongate elements are of steel.

9. An optical cable as claimed in claim 4, wherein the central reinforcing member comprises a single elongate element.

10. An optical cable as claimed in claim 9, wherein the single elongate element is of steel.

11. An optical cable as claimed in claim 4, wherein the central reinforcing member includes at least one electrical conductor.

12. An optical cable as claimed in claim 11, wherein the central reinforcing member is a single elongate element of an electrically conductive metallic material.

13. An optical cable as claimed in claim 11, wherein the central reinforcing member is a single elongate element and the electrical conductor is constituted by a layer of electrically conductive metallic material applied to the elongate element.

14. An optical cable as claimed in claim 11, wherein at least one of the elongate elements of the stranded member is of electrically conductive metallic material.

15. An optical cable as claimed in claim 4, wherein a layer of plastics material surrounds the central reinforcing member.

16. An optical cable as claimed in claim 15, wherein the layer surrounding the central reinforcing member is of cellular plastics material.

17. An optical cable as claimed in claim 4, wherein a layer of plastics material surrounds the layer or outermost layer of elongate optical elements.

18. An optical cable as claimed in claim 17, wherein the layer surrounding the layer or outermost layer of elongate optical elements is of cellular plastics material.

19. An optical cable as claimed in claim 4, wherein an outer concentric electrical conductor is positioned beneath the outer protective sheath.

20. An optical cable as claimed in claim 19, wherein the outer conductor comprises at least one tape of electrically conductive metallic material lapped helically about the cable.

21. An optical cable as claimed in claim 4, wherein the outer protective sheath is an extruded sheath of plastics material.

22. An optical cable as claimed in claim 4, wherein the outer protective sheath is surrounded by an oversheath of a material having a low friction coefficient.

* * * * *